United States Patent
Alrabady et al.

(10) Patent No.: US 7,926,091 B2
(45) Date of Patent: Apr. 12, 2011

(54) SECURE OVER-THE-AIR MODIFICATION OF AUTOMOTIVE VEHICULAR OPTIONS

(75) Inventors: Ansaf I. Alrabady, Livonia, MI (US); Howard J. Carver, Troy, MI (US); Salvatore G. Trupiano, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 754 days.

(21) Appl. No.: 11/945,860

(22) Filed: Nov. 27, 2007

(65) Prior Publication Data
US 2009/0138942 A1 May 28, 2009

(51) Int. Cl.
*G06F 7/04* (2006.01)
*H04L 29/06* (2006.01)

(52) U.S. Cl. ............ 726/4; 701/29; 701/102; 701/115; 318/466

(58) Field of Classification Search ............ 725/22, 725/30
See application file for complete search history.

(56) References Cited

U.S. PATENT DOCUMENTS
2004/0044454 A1* 3/2004 Ross et al. .......... 701/33
2007/0162960 A1* 7/2007 Takahashi .......... 726/4
2008/0275604 A1* 11/2008 Perry et al. .......... 701/33

* cited by examiner

*Primary Examiner* — Matthew B Smithers
(74) *Attorney, Agent, or Firm* — Ingrassia Fisher & Lorenz, P.C.

(57) ABSTRACT

A method and system are provided for secure over-the-air modification of vehicular options by a vehicle user. The system includes a vehicle and a secure server. The vehicle includes receiver circuitry for receiving and demodulating wireless signals and a controller coupled to the receiver. The secure server is accessible by the vehicle user and generates a vehicular option modification package for provision to the vehicle by generating option parameter modification instructions in response to user parameter modification requests from the vehicle owner and generating authentication information in response to unique server authentication information associated with the secure server. The vehicle's receiver demodulates received wireless signals to generate the vehicular option modification package and the vehicle's controller authenticates the vehicular option modification package and, when the vehicular option modification package is authenticated, modifies the vehicular options of the vehicle in response to the parameter modification instructions.

20 Claims, 5 Drawing Sheets

SECURE OVER-THE-AIR MODIFICATION OF AUTOMOTIVE VEHICULAR OPTIONS

TECHNICAL FIELD

The present invention generally relates to secure over-the-air communications, and more particularly relates to user modification of automotive vehicular options via secure over-the-air communications.

BACKGROUND OF THE INVENTION

With the proliferation of user-selectable vehicle options for automobiles, the need for mechanisms to alter or reprogram vehicle options, such as vehicle personalization settings, has turned to over-the-air programming. Over-the-air programming is advantageous, because WiFi applications such as downloading music and pre-computed navigation directions to a vehicle from a vehicle user's information handling device, such as a home personal computer (PC), can also be provided over the same wireless connection. However, establishing a secure wireless connection between a home PC and the vehicle is desirable. While IEEE 802.11i establishes criteria for creation of a secure wireless connection between a wireless access point and the vehicle to allow the home PC to interface to the vehicle, without additional secure methodology, it is desirable to limit the introduction of applications and limit or prohibit the ability of the home PC to alter vehicle personalization settings that a vehicle manufacturer maintains as factory programmable.

Accordingly, it is desirable to provide a method and apparatus for secure over-the-air modification of automotive vehicular options. In addition, other desirable features and characteristics of the present invention will become apparent from the subsequent detailed description and the appended claims, taken in conjunction with the accompanying drawings and the foregoing technical field and background.

SUMMARY OF THE INVENTION

A system is provided for over-the-air modification of vehicular options by a vehicle user. The system includes a vehicle and a secure server. The vehicle includes receiver circuitry for receiving and demodulating wireless signals and a controller coupled to the receiver. The secure server is accessible by the vehicle user and generates a vehicular option modification package for provision to the vehicle by generating option parameter modification instructions in response to user parameter modification requests from the vehicle owner and generating authentication information in response to unique server authentication information associated with the secure server. The vehicle's receiver demodulates received wireless signals to generate the vehicular option modification package and the vehicle's controller authenticates the vehicular option modification package and, when the vehicular option modification package is authenticated, modifies the vehicular options of the vehicle in response to the parameter modification instructions.

A method is provided for generating a vehicular option modification package for over-the-air modification of vehicular options by a vehicle user. The method includes coupling an information handling device accessible by the vehicle user to a secure server, the secure server having unique server authentication information associated therewith; and generating parameter modification instructions at the secure server in response to user parameter modification information provided by the information handling device to the secure server, the user parameter modification information generated by the information handling device in response to user inputs received at the information handling device. The method further includes the secure server combining the parameter modification instructions with authentication information to generate the vehicular option modification package, wherein the authentication information includes the unique authentication information associated with the secure server.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
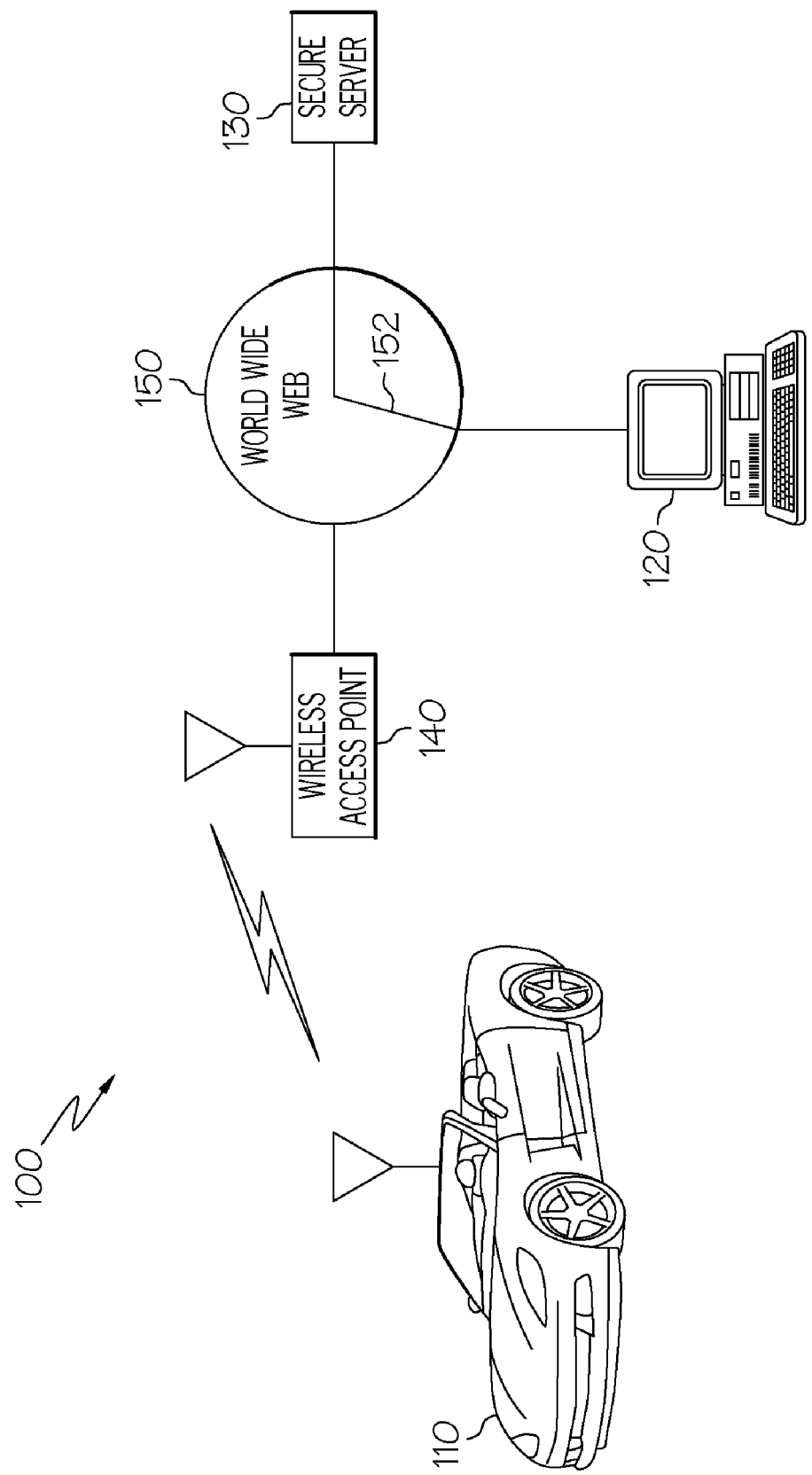
FIG. 1 illustrates a system for over-the-air modification of vehicular options in accordance with an embodiment of the present invention.

Referring to FIG. 1, a system 100 for over-the-air modification of vehicular options in a vehicle 110 by a vehicle user utilizing a home personal computer (PC) 120 is depicted in accordance with an embodiment of the present invention. While the user device shown is a home PC 120, it is contemplated that any information handling device, such as a home PC 120, a cellular telephone or a personal digital assistant, with internet connectivity could be utilized. In accordance with the present embodiment, the system 100 includes a vehicle control system of the vehicle 110, the home PC 120, a secure server 130 and a wireless access point 140. The home PC 120 is coupleable to the secure server 130 via a number of connection resources, such as an internet connection 152 across the World Wide Web 150.

The wireless access point 140 can wirelessly connect to the vehicle 110 and may be connected to the World Wide Web 150 to enable connection to either the secure server 130 or the home PC 120. Alternatively, the wireless access point 140 may be located in the home of the vehicle user and may be coupleable to the home PC 120 via a local area network (LAN) or WiFi wireless communication. Further, the wireless access point 140 may be hardwired to the home PC 120, such as a peripheral attached to the home PC 120.

Figure 2:
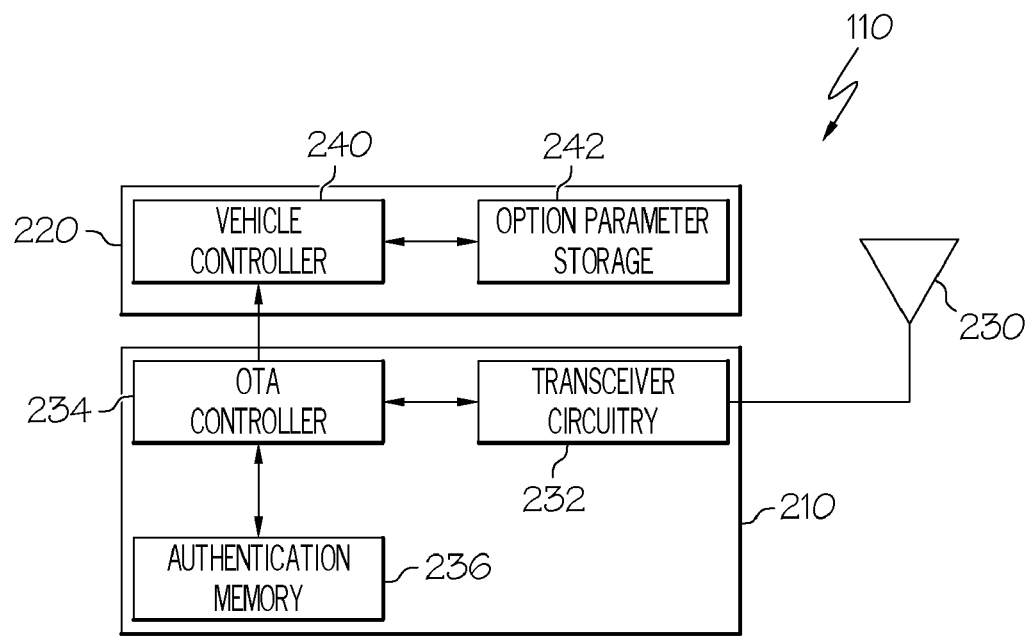
FIG. 2 illustrates a block diagram of a vehicle control system of the system of FIG. 1 in accordance with the embodiment of the present invention.

Referring to FIG. 2, a portion of a control system of the vehicle 110 in accordance with the present embodiment is shown. An authentication module 210 is coupled to a higher level control module 220 for determining the validity, authority, and integrity of wirelessly received information before passing the information on to the higher level control module 220.

The authentication module 210 includes an antenna 230, a transceiver circuitry 232, an over-the-air (OTA) controller 234 and an authentication memory 236. The antenna 230 receives and transmits radio frequency (RF) signals, such as cellular, WiFi, or WiMAX signals. Transceiver circuitry 232 includes receiver circuitry and transmitter circuitry in a manner familiar to those skilled in the art. The receiver circuitry demodulates and decodes the RF signals to derive information and provides the information to the OTA controller 234. The OTA controller 234 also provides information to the transmitter circuitry of the transceiver circuitry 232 for encoding and modulating information into RF signals for transmission from the antenna 230.

The OTA controller 234 is also coupled to the authentication memory 236 for determining the validity, authority, and integrity of the information received, and when the information has been authenticated by the OTA controller 234, the information is provided to a controller 240 of the higher level control module 220. For security purposes, the authentication memory 236 is preferably a read-only memory (ROM) that is factory programmed or an equivalent memory device wherein the vehicle stored authentication information stored in the authentication memory 236 cannot be modified by a vehicle user.

In accordance with the present embodiment, the higher level control module 220 includes an option parameter storage 242 coupled to the controller 240. One or more vehicular options may be modifiable over-the-air in accordance with the present embodiment, including vehicle display language options, vehicle lighting options, vehicle locking options and factory default options (e.g., reset parameters to factory defaults). The option parameter storage 242 may be a single memory device which stores the setting for all various vehicular options, or may be multiple memory devices, each memory device within various operational modules of the vehicle 110, wherein each of the multiple memory devices serving the function of the option parameter storage 242 are coupled to the controller 240 for modification of the vehicular options in accordance with the present embodiment.

While the portion of the control system of the vehicle 110 in accordance with the present embodiment depicted in FIG. 2 illustrates the authentication module 210 separate from the higher level control module 220, wherein each module includes a separate controller 234, 240, such structure is not required for operation in accordance with the present embodiment. The authentication module 210 may be part of or merged into the control module 220. In addition, instead of separate controllers 234, 240, the over-the-air decoding and authentication functions may be performed by the controller 240.

Figure 3:
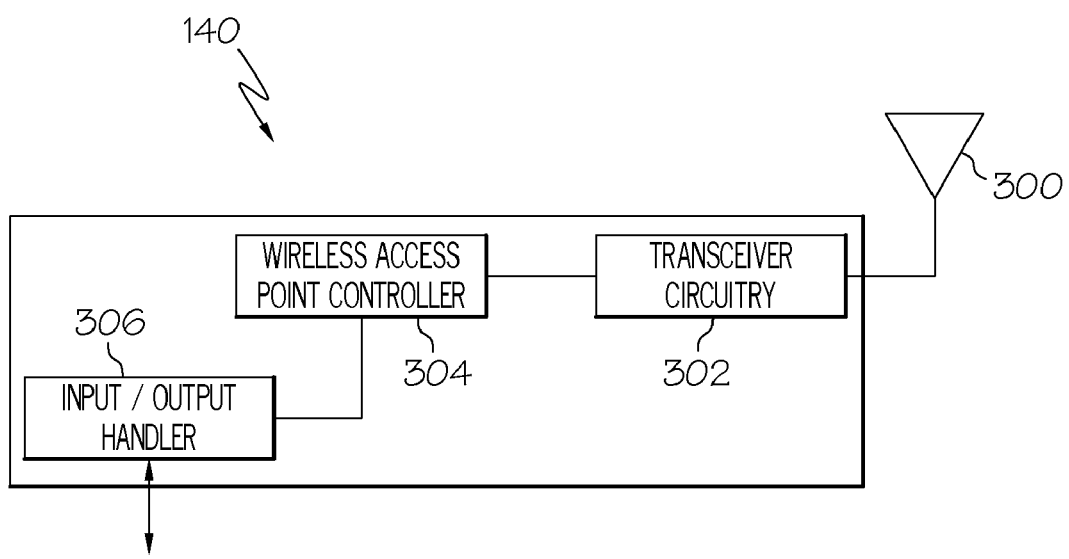
FIG. 3 illustrates a block diagram of a wireless access point of the system of FIG. 1 in accordance with the embodiment of the present invention.

Referring to FIG. 3, a block diagram of an exemplary wireless access point 140 in accordance with the present embodiment is shown. The wireless access point 140 includes an antenna 300 which transmits RF signals to the vehicle 110 as cellular, WiFi, or WiMAX signals. The antenna 300 can also receive RF signals. Transceiver circuitry 302 includes transmitter circuitry and receiver circuitry in a manner familiar to those skilled in the art. A wireless access point (WAP) controller 304 provides information to the transmitter circuitry of the transceiver circuitry 302 for encoding and modulating information into RF signals for transmission from the antenna 300. The receiver circuitry also demodulates and decodes RF signals to derive information therefrom and provides the information to the WAP controller 304.

The WAP controller 304 is coupled to an input/output handler 306 which encodes information for provision to a device coupled to the wireless access point 140 (e.g., the home PC 120) and decodes information received from such device. As discussed above, the input/output handler 306 could provide connection for the wireless access point 140 to an internet connection across the world wide web 150 (FIG. 1), connection for the wireless access point 140 to a local area network (LAN), or a wireless connection for the wireless access point 140, such as a WiFi connection.

Figure 4:
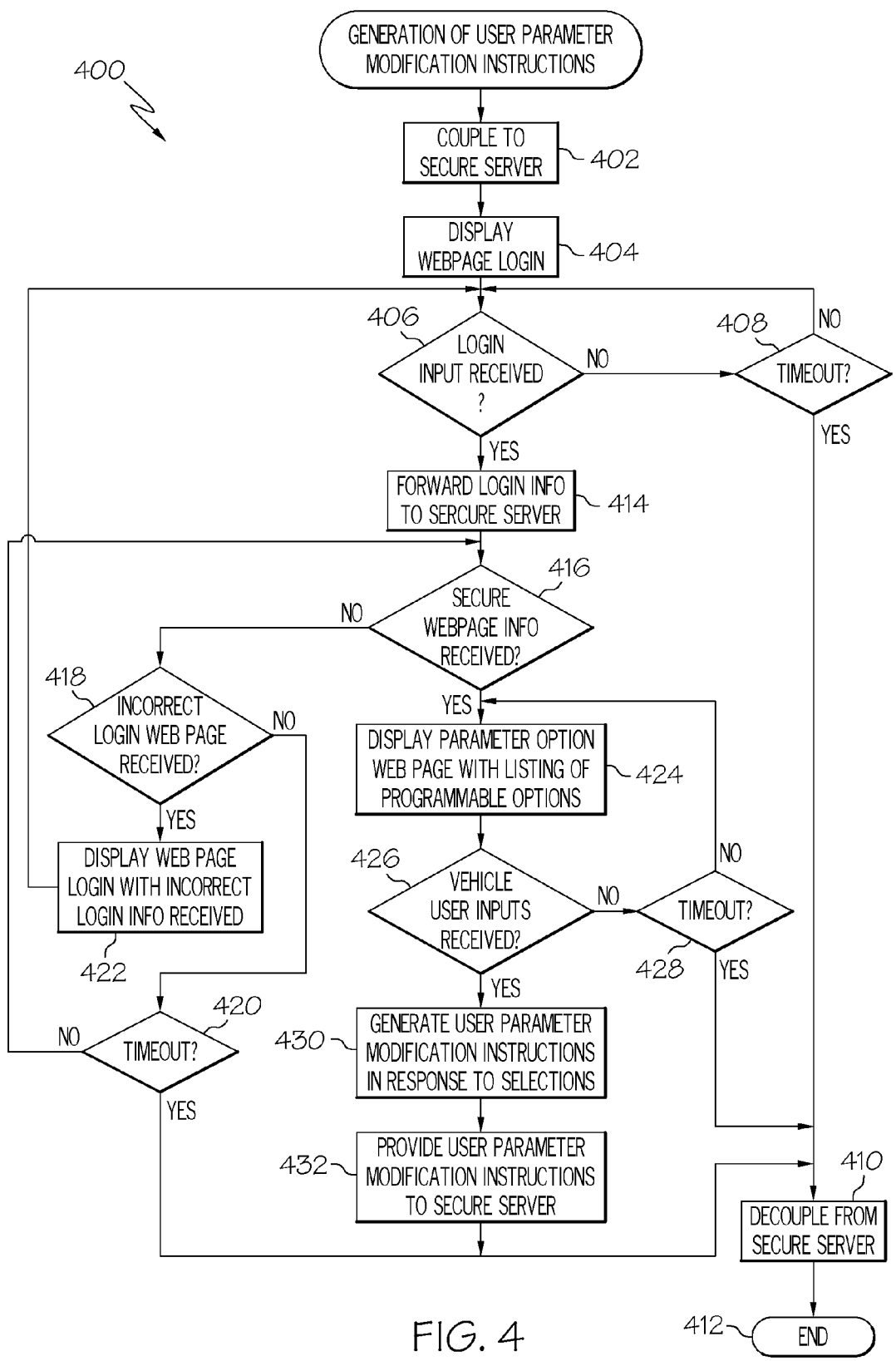
FIG. 4 illustrates a flowchart of the operation of the vehicle user's information handling device of FIG. 1 for generation of user parameter modification instructions in accordance with the embodiment of the present invention.

Referring to FIG. 4, a flowchart 400 of the operation of the information handling device, such as the home PC 120, during generation of user parameter modification instructions begins by the home PC 120 accessing a secure website hosted by the secure server 130 by coupling 402 to the secure server 130 across the world wide web 150 via an internet connection 152 (FIG. 1). In response to initial information received from the secure server 130, the home PC 120 displays a website login page 404 requesting the user to enter authorized login information.

If login inputs are not received 406 by the home PC 120 from the vehicle user within a predefined timeout period 408, the home PC 120 decouples 410 from the secure server 130 and the operation of generating the user parameter modification instructions ends 412. If, on the other hand, login inputs are received 406 by the home PC 120 from the vehicle user within a predefined timeout period 408, login information corresponding to the login inputs is forwarded 414 to the secure server 130 and processing at the home PC 120 awaits reception of information from the secure server 130 indicating that incorrect login information has been received 416, reception of secure website information 418 from the secure server 130 indicating that correct login information had been forwarded, or timeout of a predetermined time period 420 without reception of either information from the secure server 130.

When the predetermined time period has timed out 420 without reception of either information from the secure server 130 indicating that incorrect login information has been received 416 or secure website information 418 from the secure server 130, the home PC 120 decouples 410 from the secure server 130 and the operation of generating the user parameter modification instructions ends 412.

When information from the secure server 130 is received 416 indicating that incorrect login information had been forwarded thereto, the home PC 120 refreshes the display of the website login page 422 indicating that incorrect login information had been entered and requesting the user to enter authorized login information. Processing then returns to await reception of user inputs 406 corresponding to login information.

When secure website information 418 is received from the secure server 130, the home PC 120 displays a parameter option selection webpage 424. The parameter option selection webpage contains a listing of one or more programmable vehicular options for the vehicle 110 that can be validly reprogrammed by the vehicle user. One possible presentation format would provide a listing of the programmable vehicular options and a checkbox for the user to check if reprogramming of that vehicular option is desired. If more than two possible settings are available for a vehicular option, the webpage could provide a pull-down menu providing the user selectable options.

For a vehicle user having more than one vehicle 110 with the capability of modifying vehicular options in accordance with the present embodiment, the initial secure website information received at step 418 would include vehicle selection information and, after selection of a specific vehicle 110 for customization of vehicular options, additional secure website information would be received for generation and display of the parameter option selection webpage at step 424.

After display of the parameter option selection webpage 424, processing awaits reception of user inputs 426 during a predetermined timeout period 428. If no user inputs are received 426 by the home PC 120 from the vehicle user within the predefined timeout period 428, the home PC 120 decouples 410 from the secure server 130 and the operation of generating the user parameter modification instructions ends 412.

When user inputs are received 426 indicating a selection of one or more of the programmable vehicular options by the vehicle user for reprogramming, the home PC 120 generates user parameter modification information 430 in response to the user inputs received at step 426 and the home PC 120 provides 432 user parameter modification instructions corresponding to the user parameter modification information to the secure server 130. Processing then proceeds (either by user selection in response to completion of selection webpage displayed, or by measurement of a timeout period, or in any other manner well known to those skilled in the art) to decoupling 410 of the home PC 120 from the secure server 130 followed by termination of the operation of generating the user parameter modification instructions 412.

Figure 5:
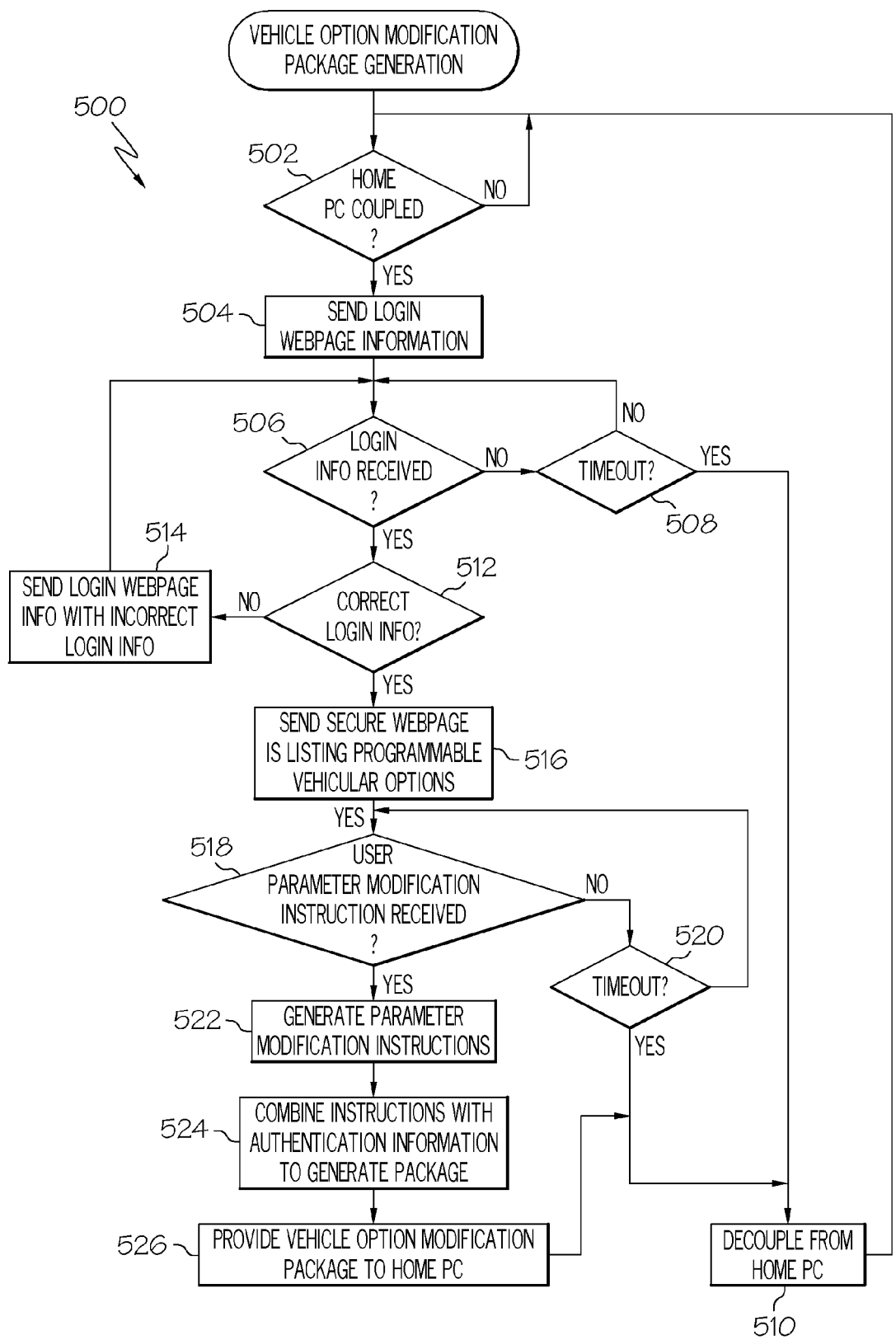
FIG. 5 illustrates a flowchart of the operation of the secure server of FIG. 1 for generation of the vehicular option modification package in accordance with the embodiment of the present invention.

While one exemplary description of a flow of the operation of generating the user parameter modification instructions has been illustrated in FIG. 4, those skilled in the art will realize other operational flows which generate the user parameter modification instructions at the home PC 120 and forward them to the secure server 130. Referring next to FIG. 5, a flowchart 500 of an exemplary vehicular option modification package generation operation at the secure server 130 is illustrated.

Initially, the secure server 130 awaits determination that the home PC 120 is coupled thereto 502 via a secure internet connection (e.g., internet connection 152 (FIG. 1)). When the home PC 120 is coupled 502 to the secure server 130, the secure server 130 sends login webpage information 504 to the home PC 120. Processing then awaits reception 506 of login information from the home PC 120. If no login information is received 506 within a predefined timeout period 508, the secure server 130 decouples 510 from the home PC 120 and processing returns to await a recoupling 502 of the home PC 120 to the secure server.

When login information is received 506 within the predefined timeout period 508, the secure server 130 determines whether the login information is valid login information 512. If the login information is not valid login information 512, the secure server 130 resends login webpage information to the home PC 120 with information indicating that the login information received is invalid login information 514 and processing returns to await reception 506 of additional login information from the home PC 120.

If the login information is valid login information 512, secure website information generated in response to the valid login information is provided 516 to the home PC 120 to enable the home PC to display the parameter option selection webpage (step 424, FIG. 4). Thus, the parameter option selection webpage displayed to the vehicle user on the home PC 120 is customized to the vehicle 110 based upon the valid login information received at step 512. For example, it is contemplated that the secure server 130 will generate vehicular option modification packages for a variety of vehicle makes and models and that valid login information will correspond to a specific vehicle 110 or to a specific vehicle user.

For a vehicle user having more than one vehicle 110 with the capability of modifying vehicular options in accordance with the present embodiment, a single unique login would be assigned and, after a successful login, a webpage would be displayed requesting the user to identify a particular vehicle 110 for customization of vehicular options. In this instance, step 512 would include determining that the user has provided valid vehicle selection information identifying a particular vehicle 110 for customization and, at step 516, the parameter option selection webpage for the particular vehicle 110 is provided to the home PC 120 for display to the vehicle user.

After the secure parameter option selection webpage information generated in response to the valid login information and, if the vehicle user has multiple registered vehicles, the vehicle selection information is provided 516 to the home PC 120, the secure server 130 awaits reception of user parameter modification instructions 518 from the home PC 120. If no user parameter modification instructions are received 518 within a predefined timeout period 520, the secure server 130 decouples 510 from the home PC 120 and processing returns to await a recoupling 502 of the home PC 120 to the secure server.

When user parameter modification instructions are received 518 within the predefined timeout period 520, the secure server 130 generates option parameter modification instructions 522 in response to the user parameter modification instructions. By the secure server 130, an authorized source, generating the option parameter modification instructions 522, it can be assured that the option parameter modification instructions are valid and follow a set of predefined rules.

The secure server 130 has unique server authentication information associated therewith. This authentication information could be secure server electronic signature information unique to the secure server 130 or other unique information which, when received and decoded by another entity, uniquely identifies the secure server 130. After generating option parameter modification instructions 522, the secure server 130 combines the option parameter modification instructions with the unique server authentication information associated with the secure server 130 to generate the vehicular option modification package 524.

The secure server 130 then provides 526 the vehicular option modification package to the home PC 120 and decouples 510 from the home PC 120. Processing then returns to await a recoupling 502 of the home PC 120 to the secure server. Similar to that stated above in regards to FIG. 4, one exemplary description of a flow of the operation of generating the vehicular option modification package has been illustrated in FIG. 5. Those skilled in the art may realize other operational flows which generate a vehicular option modification package at the secure server 130 in accordance with the present embodiment. For example, at step 526, instead of providing the vehicular option modification package to the home PC 120 for later transmittal to the vehicle 110, the secure server 130 could access the wireless access point 140 and provide the vehicular option modification package directly to the vehicle 110.

Figure 6:
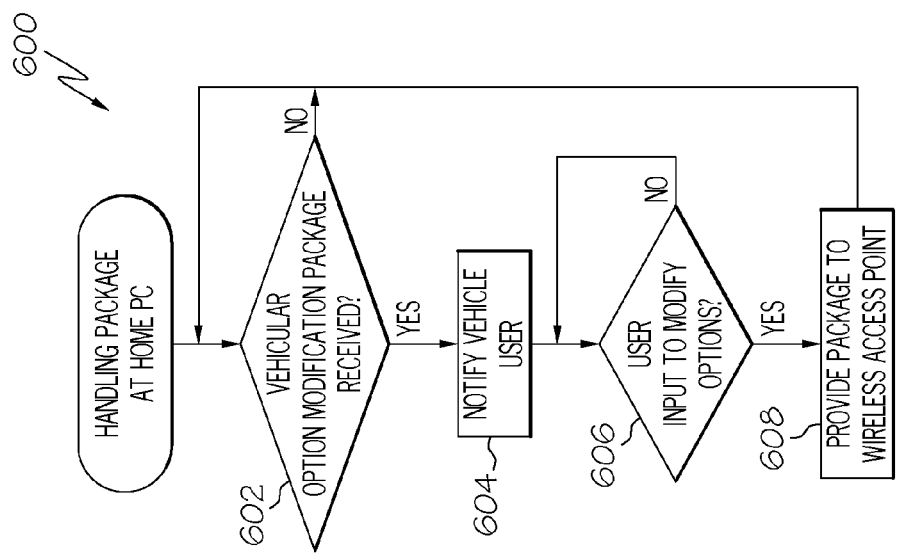
FIG. 6 illustrates a flowchart of the operation of the vehicle user's information handling device of FIG. 1 for handling of the vehicular option modification package in accordance with the embodiment of the present invention.

Referring to FIG. 6, a flowchart 600 of an operation for handling the vehicular option modification package at the home PC 120 begins when a vehicular option modification package is received 602 at the home PC 120. When the vehicular option modification package is received 602, the home PC 120 notifies the vehicle user 604 and awaits reception of a user input indicating that the vehicle options are to be modified 606. In response to receiving the user input indicating that the vehicle options are to be modified 606, the home PC 120 provides the vehicular option modification package to the wireless access point 140. Note that during this process, the integrity of the personalization parameters is maintained as the home PC does not alter the vehicular option modification package. Accordingly, the likelihood of any malicious application in the home PC, such as a computer virus or other computer bug, is greatly reduced.

Figure 7:
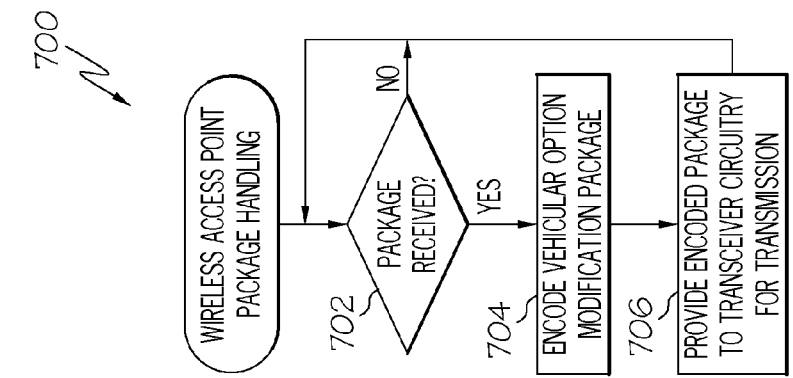
FIG. 7 illustrates a flowchart of the operation of the wireless access point of FIG. 1 for handling of the vehicular option modification package in accordance with the embodiment of the present invention.

Referring to FIG. 7, a flowchart 700 of an operation for handling the vehicular option modification package by the WAP controller 304 at the wireless access point 140 begins when a vehicular option modification package is received 702 at the WAP controller 304. When the vehicular option modification package is received 702, the WAP controller 304 encodes the vehicular option modification package for wireless transmission 704. The encoded vehicular option modification package is provided 706 to the WAP transceiver circuitry 302 for modulation onto a carrier wave and wireless transmission to the vehicle 110.

Figure 8:
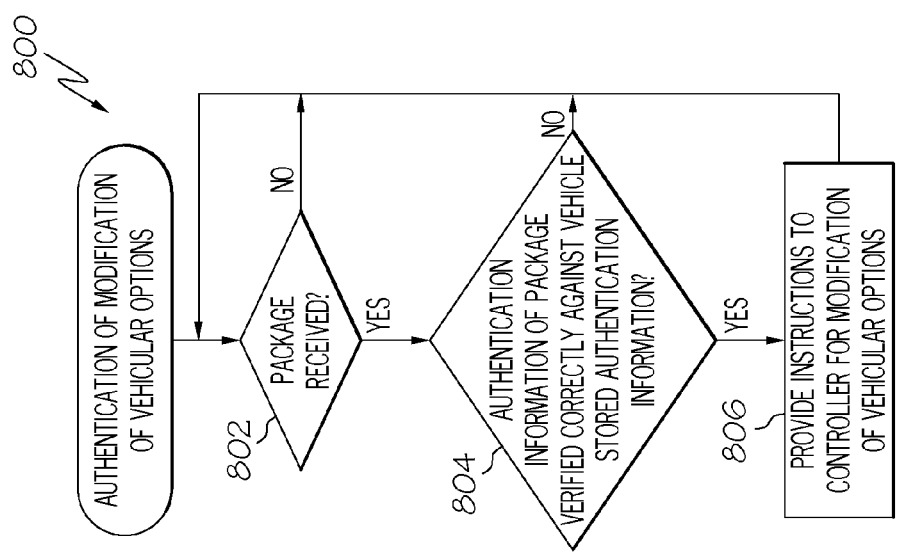
FIG. 8 illustrates a flowchart of the operation of the vehicle over-the-air controller of FIG. 2 for handling of the vehicular option modification package in accordance with the embodiment of the present invention.

Referring to FIG. 8, a flowchart 800 of an operation for the OTA controller 234 authorizing modification of vehicular options of the vehicle 110 in response to the vehicular option modification package begins when a vehicular option modification package is received 802 at the OTA controller 234. Thus, when the transceiver circuitry 232 receives and demodulates radio frequency signals and provides the demodulated signals to the OTA controller 234, the OTA controller 234 decodes the demodulated signals and determines whether the decoded signals are a vehicular option modification package 802.

When the vehicular option modification package is received 802, the OTA controller 234 compares authentication information in the vehicular option modification package with vehicle stored authentication information in the authentication memory 236 to verify the authentication information correctly against the vehicle stored authentication information 804. For example, the vehicle stored authentication information in the authentication memory 236 could include secure server electronic signature information unique to the secure server 130. In this instance, the OTA controller 234 would determine whether at least a portion of the authentication information in the vehicular option modification package verifies correctly against the secure server electronic signature information.

Thus the OTA controller 234 determines whether the vehicular option modification package was generated by an authorized source and not by a malicious application or other source by requiring the OTA controller 234 of the vehicle 110 to check the validity, authority, and integrity of the received vehicular option modification package 804. Any unauthorized attempt to change to the vehicular options of the vehicle 110 is detected at step 804 and ignored by the vehicle 110 (i.e., not passed on to the higher level vehicle controller 240).

When the OTA controller 234 authenticates the vehicular option modification package 804, the vehicular option modification package is provided 806 to the vehicle controller 240 for modification of the vehicular options of the vehicle 110 in response to the parameter modification instructions of the vehicular option modification package, the vehicle controller storing the modified vehicular options in the option parameter storage 242.

Thus it can be seen, that the present embodiment secure method and system for over-the-air modification of vehicular options by a vehicle user where the secure server 130 presents the vehicle user a web page on the home PC 120 which includes parameters that can be customized by the user. After the vehicle user sets the parameters according to his or her preference, the secure server 130 generates a vehicular option modification package that includes these preferences. The secure server 130 signs the package and sends it to the home PC 120. The home PC 120 provides the vehicular option modification package to the vehicle 110 and the vehicle 110 checks the signature within the vehicular option modification package for authentication thereof, thereby providing the vehicle 110 the ability for the vehicle to detect unauthorized attempts to modify the vehicular options, such as unauthorized attempts initiated by malicious applications in the home PC 120. If the signature is valid, the vehicle 110 accepts the vehicular option modification package and interprets the contents accordingly.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for over-the-air modification of vehicular options via a client server, the vehicular options being stored in an on-vehicle control module, the method comprising the steps of:
   accessing an secure server;
   transmitting a user parameter modification request to the secure server;
   receiving an option parameter modification instruction generated by the secure server and authentication information in response to the user parameter modification request transmitted to the secure server;
   verifying the authentication information by the vehicle control module with vehicle authentication information stored in the vehicle; and
   modifying the vehicular options of the vehicle in response to the option parameter modification instruction received from the secure server when the authentication information is verified correctly against the vehicle authentication information stored in the vehicle.

2. The method in accordance with claim 1 wherein the authentication information includes an electronic signature that is unique to the secure server and the step of modifying the vehicular options comprises the step of modifying the vehicular options of the vehicle in response to the option parameter modification instruction when the electronic signature is verified correctly against at least a portion of the vehicle authentication information.

3. The method in accordance with claim 1 further comprising the step of combining the option parameter modification instruction with the authentication information having unique authentication information associated with the secure server to generate a vehicular option modification package.

4. The method in accordance with claim 3 further comprising the step of transmitting the vehicular option modification package in response to the option parameter modification instruction.

5. The method in accordance with claim 4 further comprising the steps of:
transmitting the vehicular option modification package from the secure server to a wireless access point; and
transmitting the vehicular option modification package from the wireless access point to the vehicle.

6. The method in accordance with claim 3 wherein the step of accessing the secure server comprises the step of coupling an information handling device to the secure server, and wherein the step of transmitting a user parameter modification request to the secure server comprises the steps of:
generating the user parameter modification request with the information handling device in response to a user input; and
transmitting the user parameter modification request from the information handling device to the secure server.

7. The method in accordance with claim 6 further comprising the steps of:
transmitting the vehicular option modification package from the secure server to the information handling device; and
transmitting the vehicular option modification package to the vehicle.

8. The method in accordance with claim 7 wherein the step of the transmitting the vehicular option modification package to the vehicle comprises the steps of:
transmitting the vehicular option modification package to a wireless access point; and
transmitting the vehicular option modification package from the wireless access point wirelessly to the vehicle.

9. The method in accordance with claim 1 wherein the vehicular options comprise a vehicle display language option.

10. A method for generating a vehicular option modification package for over-the-air modification of vehicular options by a vehicle user, the method comprising the steps of:
coupling an information handling device accessible by the vehicle user to a secure server;
generating user parameter modification information with the information handling device in response to user inputs received from the vehicle user;
transmitting the user parameter modification information from the information handling device to the secure server;
generating a parameter modification instruction at the secure server in response to user parameter modification information received by the information handling device; and
combining the parameter modification instruction with authentication information that is verifiable compared to vehicle authentication information stored in an onboard vehicle control module having unique authentication information associated with the secure server to generate a vehicular option modification package.

11. The method in accordance with claim 10 wherein the step of coupling the information handling device to the secure server comprises the step of the information handling device accessing a secure website hosted by the secure server via an internet connection.

12. The method in accordance with claim 11 wherein the step of generating the parameter modification instruction comprises the steps of:
transmitting a listing of one or more programmable vehicular options from the secure server to the information handling device; and
transmitting the user parameter modification information from the information handling device to the secure server, the user parameter modification information including information selecting one or more of the one or more programmable vehicular options.

13. A system for over-the-air modification of vehicular options by a vehicle user, the system comprising:
a transmitter configured to transmit a user modification request and authentication information to a secure server;
a receiver configured to receive an option parameter modification instruction generated by the secure server in response to the user modification request and authentication information; and
a controller coupled to the receiver and configured to:
verify the authentication information against authentication information stored in a vehicle; and
modify the vehicular options of the vehicle in response to the option parameter modification instruction when the authentication information is verified against the authentication information stored in the vehicle.

14. The system of claim 13 further comprising an information handling device accessible by the vehicle user, wherein the information handling device is coupleable to the secure server for generating the user modification request in response to user inputs by the vehicle user and configured to provide the user modification request to the secure server.

15. The system of claim 14 wherein the information handling device is coupleable to the secure server via an internet connection.

16. The system of claim 15 wherein the information handling device is configured to provide the user modification request to the secure server by accessing a secure webpage via an internet connection.

17. The system of claim 14 wherein the information handling device is further coupleable to receive the vehicular option modification package from the secure server and providing the vehicular option modification package to vehicle.

18. The system of claim 17 further comprising a wireless access point coupleable to the information handling device, the wireless access point configured to forward the vehicular option modification package to the vehicle in response to a user input from the vehicle user.

19. The system of claim 13 wherein the vehicular options comprise a vehicle lighting option.

20. The system of claim 13 wherein the vehicular options comprise a factory default option.

* * * * *